Feb. 25, 1958  J. E. MILLER  2,824,586
TRIMMING AND FELLING SUPPORT FOR POWER SAWS
Filed Aug. 16, 1955
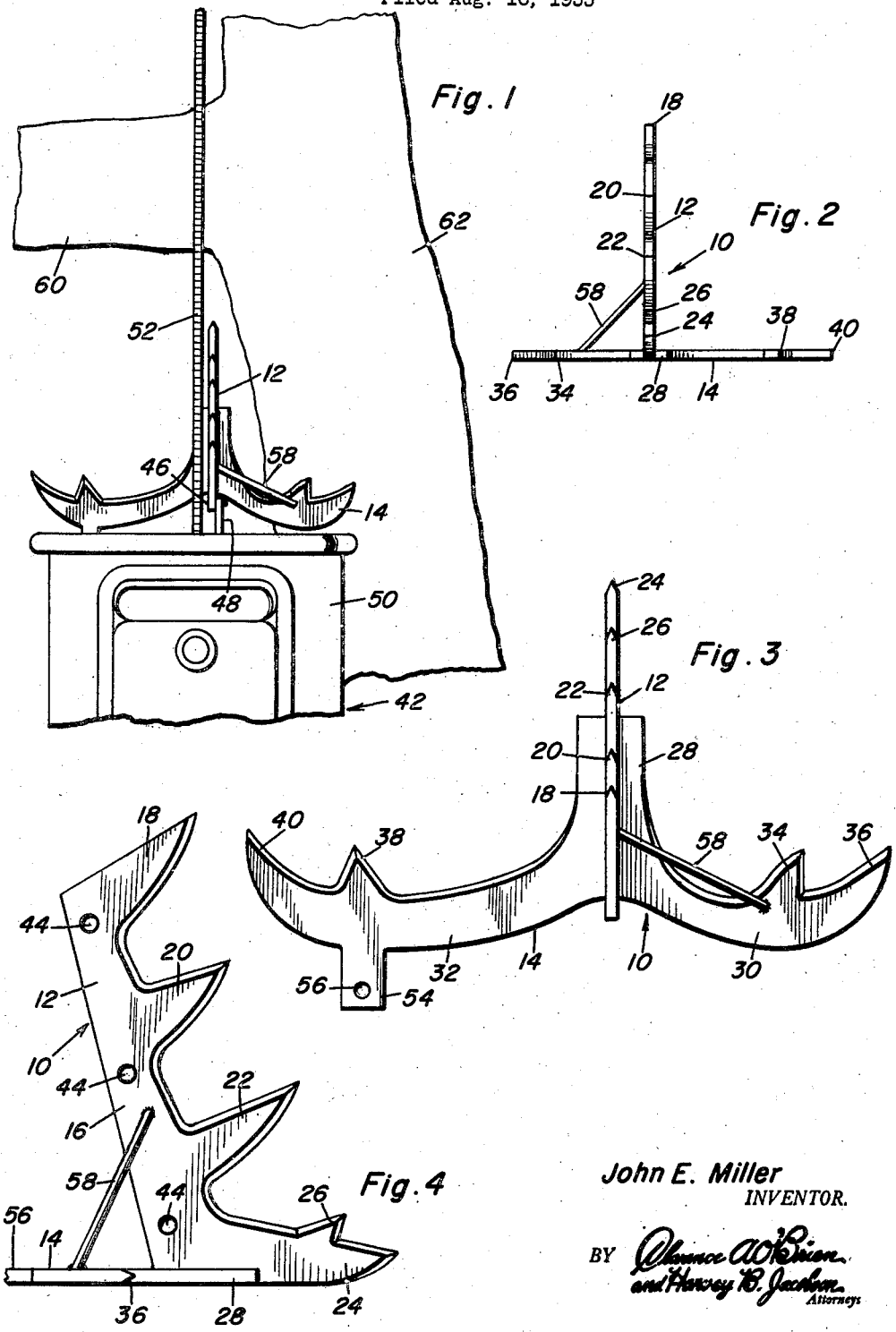
John E. Miller
INVENTOR.

United States Patent Office 2,824,586
Patented Feb. 25, 1958

2,824,586

TRIMMING AND FELLING SUPPORT FOR POWER SAWS

John E. Miller, Maverick, Ariz.

Application August 16, 1955, Serial No. 528,619

5 Claims. (Cl. 143—157)

This invention relates in general to new and useful improvements in portable power saws, and more specifically to a trimming and felling support therefor.

All power saws are provided with felling supports which are engageable with the trunks of trees for supporting the power saw in a cutting position. The felling support is of such a nature whereby it will support a power saw either in a position for cutting down a tree or for cutting up the trunk of a tree after it has been felled. However, the felling support is so related with respect to the other components of the power saw so as to make it impossible to utilize the felling support in the trimming of limbs from a tree trunk. Accordingly, when limbs are trimmed from a tree trunk utilizing a power saw, it is necessary for the operator of the power saw to support substantially all the weight of the power saw.

It is therefore the primary object of this invention to provide an improved trimming and felling support which is so constructed whereby a power saw may be properly supported on a tree trunk and manipulated by an operator thereof for conveniently cutting limbs from such tree trunk.

Another object of this invention is to provide an improved trimming and felling support which is so constructed whereby it will support a power saw with respect to a tree trunk for cutting the limbs therefrom, the support being so constructed whereby the power saw may be supported on opposite sides of the tree trunk for cutting limbs on opposite sides thereof without reversing the direction of the power saw.

A further object of this invention is to provide an improved trimming and felling support for power saws, the support being of such a construction it may be utilized equally as well for the felling of a tree, the cutting of the trunk of a tree into sections, or for removing limbs from the tree trunk.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary top plan view of a power saw utilizing the trimming and felling support, which is the subject of this invention, the power saw being utilized for the purpose of cutting a limb from the main trunk of a tree;

Figure 2 is a front elevational view of the trimming and felling support of Figure 1 and shows the same removed from the power saw;

Figure 3 is an enlarged top plan view of the trimming and felling support, and shows more particularly the details thereof; and Figure 4 is a side elevational view of the felling and trimming support on an enlarged scale and shows the specific details of the felling spike member thereof.

Referring now to the drawings in detail, it will be seen that there is best illustrated in Figures 2, 3 and 4 the trimming and felling support which is the subject of this invention, the trimming and felling support being referred to in general by the reference numeral 10. The trimming and felling support 10 includes a vertical felling spike member 12 and a generally horizontal trimming spike member 14.

The felling spike member 12 includes a body part 16 which slopes upwardly and slightly rearwardly. Extending forwardly from the body part 16 are upwardly forwardly extending upper pointed fingers or spikes 18, 20 and 22. Extending forwardly from the lower end of the body part 16 is a lower pointed finger or spike 24. The finger 24 has projecting upwardly and forwardly from an intermediate part thereof an intermediate pointed finger or spike 26. The fingers 18, 20, 22, 24 and 26 are intended to engage a tree trunk and permit the proper supporting of a power saw while the blade thereof is forced into the trunk during a cutting operation.

As is best illustrated in Figure 3, the felling spike member 14 includes a generally centrally disposed forwardly projecting body part 28 which underlies the felling spike member 12. The felling spike member 12 is seated on the body part 28 and is suitably secured thereto by welding or the like. Extending outwardly from opposite sides of the body part 28 are arcuate body parts 30 and 32. The body part 30 terminates in a pair of forwardly projecting pointed fingers or spikes 34 and 36. The body part 32 terminates at its outer end in a pair of similar forwardly projecting pointed fingers or spikes 38 and 40.

In order that the trimming and felling support 10 may be mounted on a conventional type of power saw, such as the power saw which is best illustrated in Figure 1 and which is referred to in general by the reference numeral 42, the body part 12 is provided with a plurality of vertically spaced apertures 44. The apertures 44 have passed therethrough suitable fasteners 46 carried by a mounting flange 48 of the housing 50 of the saw 42. When the trimming and felling support 10 is properly mounted on the power saw 42, the felling spike member 12 is disposed closely adjacent the saw blade 52 thereof and in parallel relation with respect thereto, as is best illustrated in Figure 1. The trimming spike member 14 will underlie the saw blade 52 with the saw blade 52 passing over the body part 32 thereof.

The felling and trimming support 10 is braced with respect to the saw housing 50 by means of a tab 54. The tab 54 is provided with an aperture 56 which receives a fastener (not shown) carried by the saw housing 50. The tab 54 is carried by the outer end portion of the body part 32 and extends rearwardly therefrom.

It is to be noted that the trimming spike members 14 are braced with respect to the felling spike member 12 by means of a diagonal brace 58. The diagonal brace 58 extends downwardly and rearwardly from an intermediate part of the felling spike member 12 to an intermediate part of the body part 30.

When it is desired to utilize the saw 42 in the trimming of a limb, such as the limb 60, from a tree trunk 62, the power saw 42 is supported with respect to the tree trunk 62 by means of the pointed fingers of the trimming spike member 14. In the event the limb 60 is on the left side of the tree trunk 12, as is illustrated in Figure 1, the body part 30 and the pointed fingers 34 and 36 thereof are utilized. On the other hand, should the limb 60 be on the right side of the tree trunk 62, then, the body part 32 of the trimming spike member 14 would be utilized with the pointed fingers 38 and 40 thereof engaging the trunk 62. A majority of the weight of the power saw 42 is supported by the trimming and felling support 10, and in order to cut off the limb 60, it is merely necessary to pivot the power saw 42 on the fingers 34 and 36 so that the saw blade 52 thereof will effectively cut into the limb 60.

From the foregoing description of the present invention, it will be readily apparent that there has been devised a support for use with power saws which is so constructed that it may be utilized for the convenient supporting of a power saw in both a felling and trunk cutting operation, and also may be utilized equally as well for supporting the power saw when it is desired to trim tree limbs from the tree trunk.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A trimming and felling support for chain saws, said trimming and felling support comprising a felling spike member adapted to be mounted in parallel relation to a saw blade for cooperation therewith in cutting trunks of trees, said felling spike member including a body portion having projecting therefrom generally in the direction of the saw blade at least one trunk engageable spike, and a trimming spike member secured to said felling spike member, said trimming spike member being disposed generally at right angles to said felling spike member; said trimming spike member including a body part having projecting therefrom generally in the direction of the saw blade at least one spike to support a saw in position for trimming limbs from a tree trunk.

2. A trimming and felling support for chain saws, said trimming and felling support comprising a felling spike member adapted to be mounted in parallel relation to a saw blade for cooperation therewith in cutting trunks of trees, said felling spike member including a body portion having projecting therefrom generally in the direction of the saw blade at least one trunk engageable spike, and a trimming spike member secured to said felling spike member, said trimming spike member being disposed generally at right angles to said felling spike member, said trimming spike member including a body part having projecting therefrom generally in the direction of the saw blade at least one spike at each end to support a saw in position for trimming limbs from a tree trunk, said trimming spike member extending on opposite sides of said felling spike member, said spikes of said trimming spike member being disposed on opposite sides of said felling spike member whereby a saw may be supported on either side of a tree trunk for trimming limbs therefrom.

3. A trimming and felling support for chain saws, said trimming and felling support comprising a felling spike member adapted to be mounted in parallel relation to a saw blade for cooperation therewith in cutting trunks of trees, said felling spike member including a body portion having projecting therefrom generally in the direction of the saw blade at least one trunk engageable spike, and a trimming spike member secured to said felling spike member, said trimming spike member being disposed generally at right angles to said felling spike member, said trimming spike member including a body part having projecting therefrom generally in the direction of the saw blade at least one spike at each end to support a saw in position for trimming limbs from a tree trunk, said trimming spike member extending on opposite sides of said felling spike member, said spikes of said trimming spike member being disposed on opposite sides of said felling spike member whereby a saw may be supported on either side of a tree trunk for trimming limbs therefrom, said trimming spike member having an intermediate forwardly extending part, said felling spike member being seated on said forwardly extending part and secured thereto.

4. A trimming and felling support for chain saws, said trimming and felling support comprising a felling spike member adapted to be mounted in parallel relation to a saw blade for cooperation therewith in cutting trunks of trees, said felling spike member including a body portion having projecting therefrom generally in the direction of the saw blade at least one trunk engageable spike, and a trimming spike member secured to said felling spike member, said trimming spike member being disposed generally at right angles to said felling spike member, said trimming spike member including a body part having projecting therefrom generally in the direction of the saw blade at least one spike to support a saw in position for trimming limbs from a tree trunk, means on said felling spike member for securing said support to a saw housing, means on said trimming spike member for bracing said support relative to a saw housing.

5. A trimming and felling support for chain saws and the like comprising a felling spike member adapted to be mounted in parallel relation to a saw blade in cooperation therewith in cutting trunks of trees, and a trimming spike member secured to said felling spike member, said trimming spike member being disposed generally at right angles to said felling spike member, said trimming spike member being engageable with a tree trunk to support a saw in position for trimming limbs from the tree trunk, said trimming spike member extending on opposite sides of said felling spike member whereby a saw may be supported on either side of a tree trunk, opposite ends of said trimming spike member having forwardly projecting pointed fingers.

References Cited in the file of this patent

UNITED STATES PATENTS

| 2,665,719 | Pennanen | Jan. 12, 1954 |

FOREIGN PATENTS

| 814,996 | France | Mar. 30, 1937 |
| 823,028 | France | Oct. 4, 1937 |